US012607335B1

(12) United States Patent
Wei

(10) Patent No.: US 12,607,335 B1
(45) Date of Patent: Apr. 21, 2026

(54) POWER SUPPLY FOR LIGHT STRING

(71) Applicant: Zhejiang Lvshang Optoelectronics Technology Co., Ltd, Zhejiang (CN)

(72) Inventor: Zhiyong Wei, Zhejiang (CN)

(73) Assignee: Zhejiang Lvshang Optoelectronics Technology Co., Ltd, Zhejiang (CN)

( * ) Notice: Subject to any disclaimer, the term of this patent is extended or adjusted under 35 U.S.C. 154(b) by 0 days.

(21) Appl. No.: 19/214,300

(22) Filed: May 21, 2025

(51) Int. Cl.
*F21V 23/02* (2006.01)
*F21S 9/02* (2006.01)

(52) U.S. Cl.
CPC .............. *F21V 23/023* (2013.01); *F21S 9/02* (2013.01)

(58) Field of Classification Search
CPC ........ F21S 9/02; F21V 23/023; F21V 23/008; F21V 23/06; H01M 50/202
See application file for complete search history.

(56) References Cited

U.S. PATENT DOCUMENTS 3,522,579 A * 8/1970 Ryosuke ................... F21S 4/10 439/619
5,345,370 A * 9/1994 Murray ................. F21V 19/047 362/205
5,678,921 A * 10/1997 Kish ..................... F21V 7/0075 362/205
5,806,964 A * 9/1998 Maglica .................. F21V 23/04 362/205
2003/0005615 A1* 1/2003 Lindgren ............... A01K 85/01 43/17.5
2006/0208695 A1* 9/2006 Weinstein ............... H02J 7/342 320/112
2010/0221584 A1* 9/2010 Reber ................. H01M 50/213 429/7
2010/0271814 A1* 10/2010 Messinger ............. F21L 4/005 362/183
2013/0343042 A1* 12/2013 Windom ................ F21L 4/005 362/183
2015/0330618 A1* 11/2015 McDermott ........ F21V 23/0414 362/208
2019/0267592 A1* 8/2019 Itou ..................... H01M 50/367
2021/0262629 A1* 8/2021 Tsai ........................ H05B 45/40
2022/0228718 A1* 7/2022 Zhang ................. H01M 50/247
2022/0252231 A1* 8/2022 Wang .................. H01M 50/152
2022/0378094 A1* 12/2022 Liang .................. H01M 50/284
2022/0403988 A1* 12/2022 Shen ....................... F21V 21/30
2023/0327377 A1* 10/2023 Scanzillo ............. H01R 4/4816 439/373

(Continued)

*Primary Examiner* — Jong-Suk (James) Lee
*Assistant Examiner* — James M Endo
(74) *Attorney, Agent, or Firm* — Hawaii Patent Services; Nathaniel K. Fedde; Kenton N. Fedde

(57) ABSTRACT

The present disclosure relates to a light string power supply, which includes a battery barrel with an open end and a detachable barrel cover. Inside are a circuit board, rechargeable battery, conducting plate, and metal spring. When assembled, the battery's anode connects to the circuit board's positive input terminal, while the cathode connects to the negative input terminal via the metal spring and conducting plate. The battery barrel's far end has a connection end with two holes for electrode plates, which connect to the circuit board's output terminals when inserted. The circuit board features a digital display for gear settings, enhancing usability. With no soldering points, the product offers longer lifespan and better consistency.

19 Claims, 3 Drawing Sheets

(56) References Cited

U.S. PATENT DOCUMENTS

| | | | | |
|---|---|---|---|---|
| 2023/0395948 A1* | 12/2023 | Ke | ...................... | H01M 50/244 |
| 2024/0186602 A1* | 6/2024 | Nguyen | .............. | H01M 50/107 |
| 2024/0283267 A1* | 8/2024 | Gong | ........................ | F21S 9/02 |
| 2025/0174741 A1* | 5/2025 | Zhu | ..................... | H01M 10/425 |

* cited by examiner

POWER SUPPLY FOR LIGHT STRING

TECHNICAL FIELD

The present disclosure relates to the field of power supply technology, particularly to a power supply for a light string.

BACKGROUND

Light strings serve to adjust ambiance and are typically powered by a power supply for a light string, similar to a portable power bank. This power supply has a built-in circuit board, which adjusts the gear settings via a gear switch on the board, enabling connected light strings to switch between states such as steady illumination, flashing, and gradient changes, thereby achieving ambiance adjustment.

U.S. patent Ser. No. 12/027,725 discloses a battery pack. Existing power supplies lack a gear display function, making it impossible to directly observe the current working gear on the circuit board, which poses certain inconveniences. Additionally, existing power supplies have multiple solder joints due to numerous components, which can impact the workshop environment and worker health. These solder joints may also detach over time. Due to varying skill levels among workers in soldering and assembly processes, the product lifespan is difficult to standardize.

SUMMARY

The present disclosure provides a power supply for a light string to address the issues raised in the background art.

To achieve the above inventive object, the present disclosure adopts the following technical solutions:

The present disclosure provides a power supply for a light string, comprising a battery barrel with one open end and a barrel cover detachably connected to the open end of the battery barrel, wherein the battery barrel is internally provided with a circuit board, a rechargeable battery, a conducting plate, and a metal spring, and after assembly, a battery anode of the rechargeable battery contacts a positive input terminal of the circuit board to form an electrical connection, while a battery cathode of the rechargeable battery contacts a negative input terminal on a side of the circuit board via the metal spring and the conducting plate to form an electrical connection; and a connection end is formed at an end of the battery barrel forms away from the barrel cover for connecting to a power interface of the light string, and two insertion holes for electrode plates to be inserted are formed at the connection end, wherein when inserted in place, the electrode plates contact two electrode output terminals of the circuit board to form an electrical connection.

The present disclosure further provides a power supply for a light string, comprising a battery barrel, wherein the battery barrel is internally provided with a circuit board, a rechargeable battery, a conducting plate, and a conducting assembly, and after assembly, a battery anode of the rechargeable battery contacts a positive input terminal of the circuit board to form an electrical connection, and a battery cathode of the rechargeable battery contacts a negative input terminal on a side of the circuit board via the conducting assembly to form an electrical connection; and a connection end is formed at a top of the battery barrel for connecting to a power interface of the light string, and two insertion holes for electrode plates are formed at the connection end, wherein when inserted in place, the electrode plates contact two electrode output terminals of the circuit board to form an electrical connection.

BRIEF DESCRIPTION OF DRAWINGS

The drawings, which form part of this application, are provided to further illustrate the present disclosure. The illustrative embodiments and the descriptions thereof are intended to explain the present disclosure and do not constitute any improper limitation thereof. In the drawings.

Figure 1:
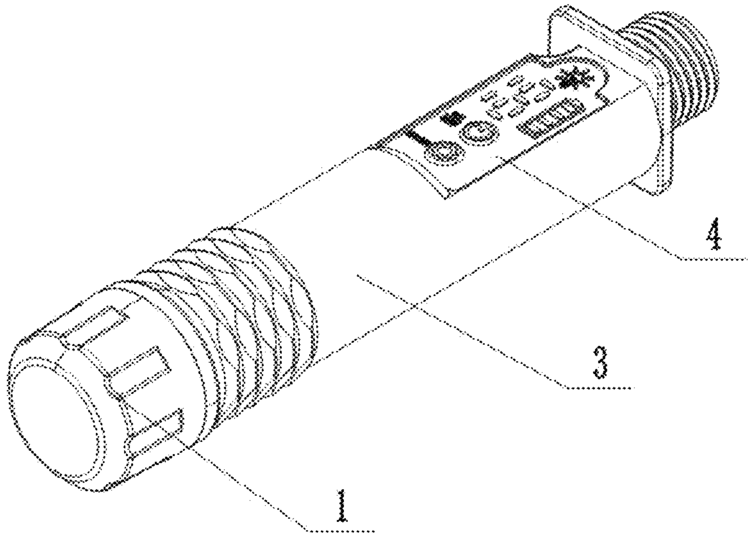
FIG. 1 is a perspective view of a power supply for a light string according to the disclosure.

Reference signs: Barrel cover (1); Sealing ring (2); Battery barrel (3); Connection end (31); Insertion hole (311); Insertion slot (32); Mounting hole (33); Lanyard hole (34); Sealing sticker (4); Rechargeable battery (5); Battery anode (51); Battery cathode (52); Metal spring (6); Conducting plate (7); Gear switch (8); Circuit board (9); Positive input terminal (91); Negative input terminal (92); Electrode output terminal (93); Power switch (10); Digital tube (11); Electrode plate (12); Textured pattern (121); Dust plug (13); Charging port (14).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 3:
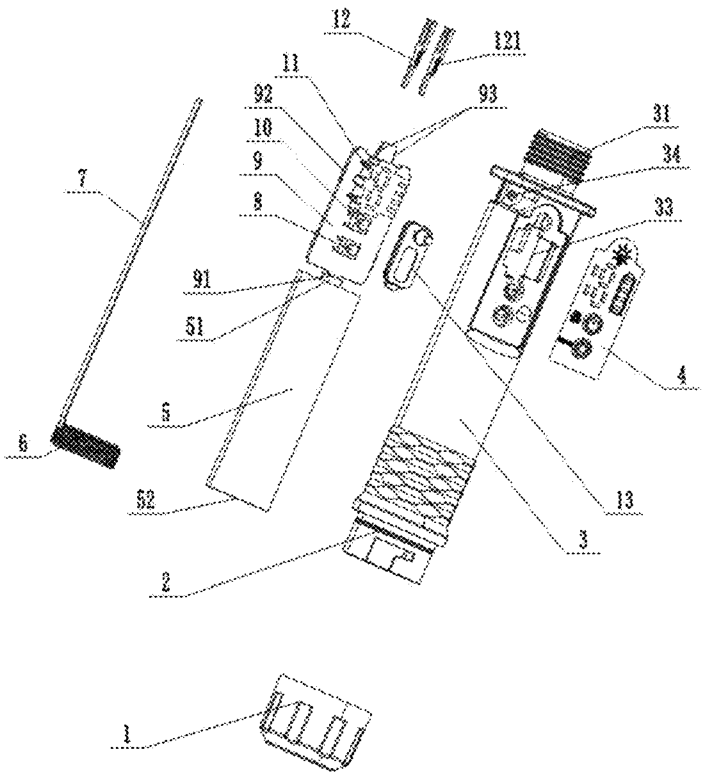
FIG. 3 is an exploded view (1) of a power supply for a light string according to the disclosure.
Figure 4:
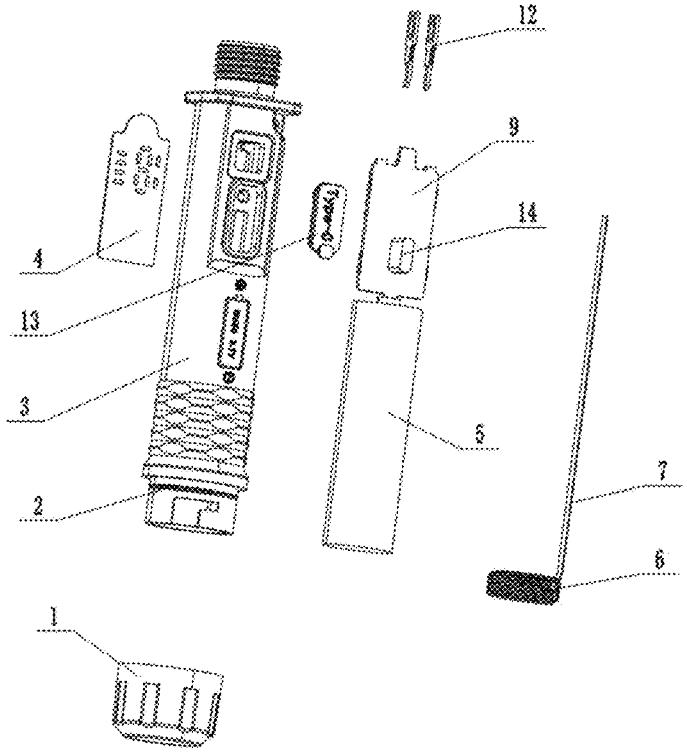
FIG. 4 is an exploded view (2) of a power supply for a light string according to the disclosure.

As shown in FIG. 1, a power supply for a light string in an embodiment of the present disclosure includes a battery barrel 3 with one open end and a barrel cover 1 detachably connected to the open end of the battery barrel 3. In the embodiment, the battery barrel 3 and the barrel cover 1 are connected by a twist-lock mechanism. The inner wall of the barrel cover 1 is provided with a snap protrusion, and the outer wall of the open end of the battery barrel 3 is provided with a snap groove (see FIG. 3). After inserting the battery barrel 3 into the barrel cover 1, the barrel cover 1 is rotated to engage the snap protrusion with the snap groove, thereby completing the connection between the battery barrel 3 and the barrel cover 1. Of course, other detachable connection methods may also be adopted, such as magnetic connection, elastic snap connection, or threaded connection. Additionally, battery barrels of other structures (not shown in the figure) may also be used. The bottom of the battery barrel is a closed end, and the battery barrel includes an upper barrel body and a lower barrel body. A snap structure is arranged between the upper and lower barrel bodies for connection, thereby forming the battery barrel.

As shown in FIGS. 2-5, in this embodiment, the battery barrel 3 is internally provided with a circuit board 9, a rechargeable battery 5, and a conducting assembly. The circuit board 9 is formed with a positive input terminal 91, a negative input terminal 92, and an electrode output terminal 93, where the positive input terminal 91 is located at the bottom of the circuit board 9, the negative input terminal 92 is located on the side, and the electrode output terminal 93 is located at the top of the circuit board 9 (see FIGS. 2 and 3). In this embodiment, the conducting assembly includes a conducting plate 7 and a metal spring 6. The metal spring 6 contacts the battery cathode 52 of the rechargeable battery 5, the bottom end of the conducting plate 7 contacts the metal spring 6, and the top end of the conducting plate 7 contacts the negative input terminal 92 on the side of the circuit board 9, establishing an electrical connection between the negative input terminal 92 and the battery cathode 52. In other embodiments (not shown), the conducting assembly may also be an approximately L-shaped conducting plate, where the upper end of the conducting plate still contacts the negative input terminal 92 on the side of the circuit board 9, and the lower end of the conducting plate forms an upwardly bent metal spring tab that contacts the battery cathode 52 of the rechargeable battery 5, achieving an electrical connection between the negative input terminal 92 and the battery cathode 52.

Figure 2:
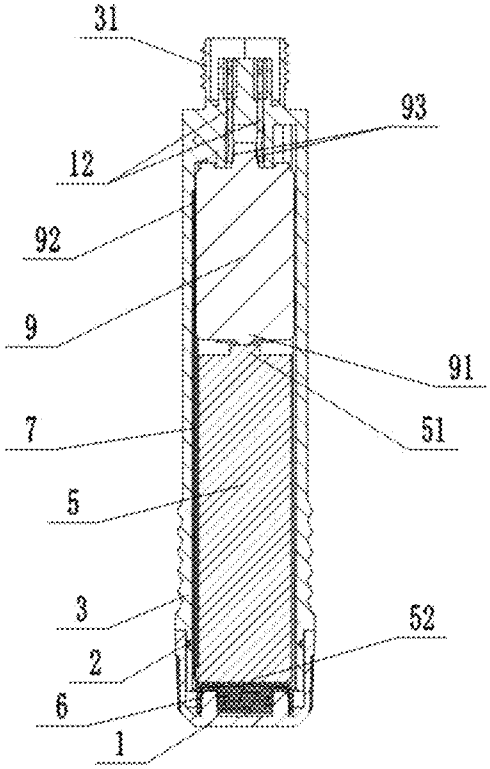
FIG. 2 is a cross-sectional view of a power supply for a light string according to the disclosure.
Figure 5:
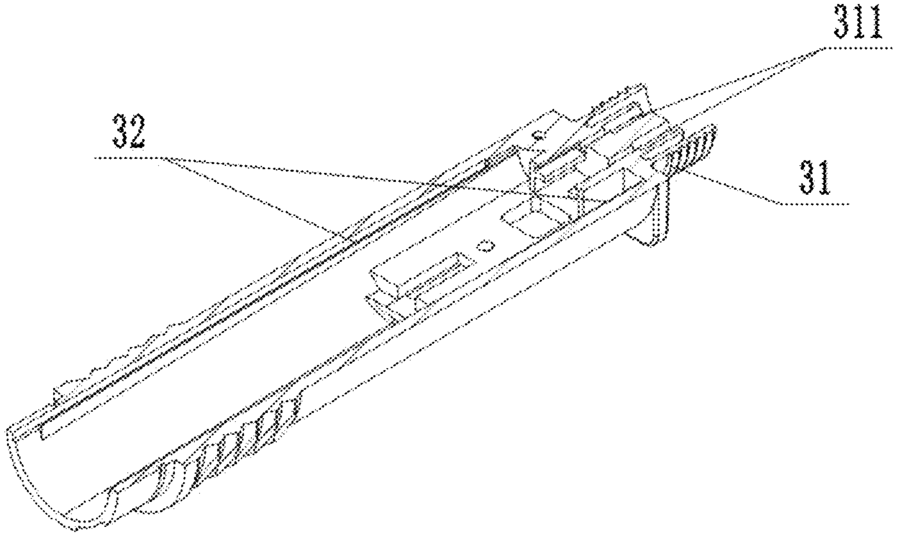
FIG. 5 is a cross-sectional view of the battery barrel according to the disclosure.

As shown in FIG. 2, after assembly, the battery anode 51 of the rechargeable battery 5 contacts the positive input terminal 91 of the circuit board 9 to form an electrical connection, while the battery cathode 52 of the rechargeable battery 5 contacts the negative input terminal 92 on the side of the circuit board 9 via the metal spring 6 and conducting plate 7 to establish an electrical connection. As shown in FIG. 5, a connection end 31 is formed at an end of the battery barrel 3 away from the barrel cover 1 for connecting to the power interface of a light string, with insertion holes 311 formed at the connection end 31 for inserting two electrode plates 12. When the electrode plates 12 are inserted in place, they contact the two electrode output terminals 93 of the circuit board 9 to form an electrical connection. Insertion slots 32 are formed on the inner walls of the battery barrel 3 on both sides to guide the circuit board 9 and conducting plate 7 to slide along the direction of the insertion slots 32 for assembly.

In this embodiment, the two electrode output terminals 93 are arranged in an inwardly converging and inclined state, and textured patterns 121 are formed on the electrode plate 12 to increase friction. As a result, the electrode plate 12 and the electrode output terminal 93 are pressed together via the inclined surfaces, which can prevent loosening through localized elastic deformation, ensuring stable electrical connection at this position. In other embodiments (not shown), the electrical connection between the electrode output terminal 93 and the electrode plate 12 can also be achieved through elastic clip connection or magnetic attraction. For the elastic clip connection, elastic clips are installed on both sides of the electrode output terminal 93, and these clips possess a certain degree of elastic deformation capability. When the electrode plate 12 is inserted, the elastic clips clamp the tightly, ensuring the stability of the electrical connection through friction and elastic pressure between the clips and the electrode plate 12. This connection method is simple in structure, easy to implement, and adaptable to electrode plates 12 of varying thicknesses. For the magnetic attraction connection, a magnetic material, such as neodymium-iron-boron magnets, is placed on the electrode plate 12, while a metal piece (e.g., an iron sheet) capable of attracting the magnetic material is positioned at the corresponding location on the electrode output terminal 93. When the electrode plate 12 approaches the electrode output terminal 93, the two adhere tightly due to magnetic force, achieving electrical connection.

Continuing to refer to FIGS. 2-5, in this embodiment, the battery barrel 3 is also formed with a mounting hole 33, which provides an installation position for a digital tube 11, allowing the digital tube 11 to be embedded and ensuring stable mounting of the digital tube 11. After the digital tube 11 is embedded into the mounting hole 33, it adheres tightly to the circuit board 9 to establish an electrical connection. The digital tube 11 can directly display the gear, enabling users to intuitively understand the working gear of the power supply, making operation more convenient. The circuit board 9 is further equipped with a power switch 10, a gear switch 8, and a charging port 14. The power switch 10, gear switch 8, and digital tube 11 are arranged on the same side of the circuit board 9, facilitating user operation and viewing of the display of the digital tube 11. The charging port 14 is located on the opposite side of the circuit board 9. The battery barrel 3 is fitted with a dust plug 13 at the position of the charging port 14. The dust plug 13 can prevent dust and foreign matter from entering the charging port 14, and avoid problems such as poor contact or short circuit of the charging interface caused by debris accumulation. The battery barrel 3 is also provided with a sealing sticker 4 at the position of the mounting hole 33 to realize sealing, preventing water, dust, and other impurities from entering the battery barrel through gaps between the digital tube 11 and the mounting hole 33, which could damage the circuit board 9 and other electronic components. A sealing ring 2 is also installed between the battery barrel 3 and the barrel cover 1. Once the battery barrel 3 and the barrel cover 1 are connected, the sealing ring 2 fills the gap between them, blocking external water from entering the battery barrel and further enhancing the overall waterproof performance of the product. Furthermore, the battery barrel 3 includes a lanyard hole 34, which can be used to thread a lanyard, making it convenient for users to carry the power supply for a light string, for example, by hanging it on a backpack, keychain, or suspending it in a suitable location during use, thereby improving convenience and flexibility.

In this embodiment, the positive input terminal 91, negative input terminal 92, and electrode output terminals 93 on the circuit board 9 are formed using a PCB metal edge banding process, which is prior art. The metal edge banding ensures excellent electrical connection and conductivity, such as providing pathways for power supply polarities or signal transmission. Additionally, the metal edge banding strengthens the edges of the circuit board, making it more resistant to wear and deformation during installation, insertion, or removal. Alternatively, the positive input terminal 91, negative input terminal 92, and electrode output terminal 93 can also be formed on the circuit board 9 using a PCB half-hole process or conductive ink printing process.

The circuit board is equipped with a digital tube, providing an intuitive and convenient gear display function. In practical usage scenarios, whether for decorative light strings indoors or outdoor ambiance lighting equipment, users only need to toggle the gear switch, and the digital tube will clearly display the current gear status of the light strings, significantly enhancing the user experience. The use of solderless electrical connections allows for easy assembly of power supply components. Since there is no risk of solder joint loosening, the electrical connections remain stable and reliable during long-term use, greatly extending the product's lifespan and reducing the frequency of replacements or repairs due to malfunctions, thereby saving costs for users. On the other hand, the solderless design makes the production process more standardized and uniform, with each product following the same manufacturing workflow. This reduces performance variations caused by differences in soldering processes, ensuring better product homogeneity. Additionally, the sealing ring and sealing sticker provide the power supply with excellent waterproof and dustproof performance, resulting in a high IP protection rating for the product.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A power supply for a light string, comprising:

a battery barrel with one open end and a connection end opposite the one open end for connecting to a power interface of the light string, the connection end including two insertion holes;

a barrel cover detachably connected to the one open end of the battery barrel, wherein the battery barrel is internally provided with a circuit board, a rechargeable battery, a conducting plate, and a metal spring;

the circuit board comprising a base edge, a side edge and an edge opposite the base edge, the edge opposite the base edge comprising a projection with lateral sides;

the circuit board comprising a positive input terminal on the base edge of the circuit board, a negative input terminal on the side edge of the circuit board, and two electrode output terminals respectively provided on the lateral sides of the projection;

the rechargeable battery including a battery anode and a battery cathode, the battery anode contacts the positive input terminal of the circuit board to make an electrical connection, and the battery cathode is connected to the negative input terminal on the side edge of the circuit board via the metal spring and the conducting plate to make a second electrical connection; and the two insertion holes each having a respective electrode plate disposed therein, wherein the projection is disposed between the electrode plates and each of the electrode plates is pressed against a respective one of the two electrode output terminals on the lateral sides of the projection to make a third electrical connection.

2. The power supply for the light string according to claim 1, wherein insertion slots are formed on inner walls of the battery barrel on both sides to guide the circuit board and the conducting plate to slide along the insertion slots for assembly.

3. The power supply for the light string according to claim 2, wherein the two electrode output terminals are arranged in an inwardly converging and inclined manner, and textured patterns are formed on the electrode plates to increase friction.

4. The power supply for the light string according to claim 3, wherein the battery barrel further comprises a mounting hole for embedding a digital tube, and after being embedded into the mounting hole, the digital tube is pressed against the circuit board to make a fourth electrical connection; and the circuit board is further equipped with a power switch, a gear switch, and a charging port, wherein the power switch, the gear switch, and the digital tube are located on a same side of the circuit board, while the charging port is located on an opposite side of the circuit board.

5. The power supply for the light string according to claim 4, wherein the battery barrel is further provided with a sealing sticker at a position of the mounting hole to achieve sealing, and the battery barrel is further provided with a dust plug at a position of the charging port.

6. The power supply for the light string according to claim 5, wherein the positive input terminal, the negative input terminal, and the two electrode output terminals are formed on the circuit board through a PCB metal edge banding process.

7. The power supply for the light string according to claim 6, wherein the battery barrel and the barrel cover are connected by a twist-lock mechanism, and a sealing ring is additionally configured between the battery barrel and the barrel cover.

8. The power supply for the light string according to claim 6, wherein the battery barrel is further formed with a lanyard hole.

9. The power supply for the light string according to claim 1, wherein the two electrode output terminals have elastic clips to respectively clamp said each of the respective electrode plates.

10. The power supply for the light string according to claim 1, wherein the electrode plates are pressed against the respective electrode output terminals elastically.

11. A power supply for a light string, comprising:

a battery barrel having a connection end for connecting to a power interface of the light string, the connection end including two insertion holes;

wherein the battery barrel is internally provided with a circuit board, a rechargeable battery, a conducting plate, and a conducting assembly;

the circuit board comprising a base edge, a side edge and an edge opposite the base edge, the edge opposite the base edge comprising a projection with lateral sides;

the circuit board comprising a positive input terminal on the base edge of the circuit board, a negative input terminal on the side edge of the circuit board, and two electrode output terminals respectively provided on the lateral sides of the projection;

the rechargeable battery including a battery anode and a battery cathode, the battery anode contacts the positive input terminal of the circuit board to make an electrical connection, and the battery cathode is connected to the negative input terminal on the side edge of the circuit board via the conducting assembly to make a second electrical connection; and two insertion holes each having a respective electrode plate disposed therein, wherein the projection is disposed between the electrode plates and each of the electrode plates is pressed against a respective one of the two electrode output terminals on the lateral sides of the projection to make a third electrical connection.

12. The power supply for the light string according to claim 11, wherein the conducting assembly comprises a metal spring and a conducting plate, and the battery cathode of the rechargeable battery contacts the negative input terminal on the side edge of the circuit board via the metal spring and the conducting plate to form an electrical connection.

13. The power supply for the light string according to claim 12, wherein insertion slots are formed on inner walls of the battery barrel on both sides to guide the circuit board and the conducting plate to slide along the insertion slots for assembly.

14. The power supply for the light string according to claim 13, wherein the two electrode output terminals are arranged in an inwardly converging and inclined manner, and textured patterns are formed on the electrode plates to increase friction.

15. The power supply for the light string according to claim 14, wherein the battery barrel is further provided with a mounting hole for embedding a digital tube, wherein after being embedded into the mounting hole, the digital tube is pressed against the circuit board to make a fourth electrical connection; and the circuit board is further equipped with a power switch, a gear switch, and a charging port, wherein the power switch, the gear switch, and the digital tube are located on a same side of the circuit board, while the charging port is located on an opposite side of the circuit board.

16. The power supply for the light string according to claim 14, wherein the battery barrel is further provided with a sealing sticker at a position of the mounting hole to achieve sealing, and the battery barrel is further provided with a dust plug at a position of the charging port.

17. The power supply for the light string according to claim 16, wherein the positive input terminal, the negative input terminal, and the two electrode output terminals are formed on the circuit board through a PCB metal edge banding process, a PCB half-hole process, or a conductive ink printing process.

18. The power supply for the light string according to claim 11, wherein the two electrode output terminals have elastic clips to respectively clamp said each of the respective electrode plates.

19. The power supply for the light string according to claim 11, wherein the electrode plates are pressed against the respective electrode output terminals elastically.

* * * * *